Dec. 31, 1963    F. J. FONTEIN ETAL    3,116,237
APPARATUS FOR AUTOMATICALLY DRAINING OFF
LIQUID-CONTAINING SOLID PARTICLES
Filed June 21, 1961    3 Sheets-Sheet 1

Dec. 31, 1963  F. J. FONTEIN ETAL  3,116,237
APPARATUS FOR AUTOMATICALLY DRAINING OFF
LIQUID-CONTAINING SOLID PARTICLES
Filed June 21, 1961  3 Sheets-Sheet 2

Inventors
Freerk J. Fontein
Christianus W. J. Van Koppen
By Cushman, Darby & Cushman
Attorneys 3,116,237
APPARATUS FOR AUTOMATICALLY DRAINING OFF LIQUID-CONTAINING SOLID PARTICLES
Freerk J. Fontein, Heerlen, and Christianus W. J. van Koppen, Sittard, Netherlands, assignors to Stamicarbon N.V., Heerlen, Netherlands
Filed June 21, 1961, Ser. No. 118,721
Claims priority, application Netherlands June 23, 1960
7 Claims. (Cl. 209—242)

The present invention relates to a new and improved pumping apparatus for automatically draining off liquid-containing solid particles which have been collected from a sump or the like.

Such a pumping apparatus or installation is generally used in mines for draining off mine water, and usually includes a pneumatically operated plunger pump having a suction line in communication with the collecting sump for the mine water. Likewise, there is generally provided a float on the sump water surface to control the supply of air to the pump so that the suction line is always filled with liquid.

The presence of solid particles which shorten the life of the pump is usually obviated to some degree by providing the suction line with a suction basket fitted with a fine strainer to restrict the supply of the solid particles to the pump as much as possible. However, as there is a continual accumulation of fine or coarse particles in the sump, these particles will completely shut off the suction basket so that periodic cleaning of the sump becomes necessary.

It is accordingly an object of this invention to provide a new and improved pumping apparatus of the character described which obviates the above shortcomings of such prior art installations, the pumping apparatus according to this invention having a first closed reservoir with means associated therewith for providing an intermittent subatmospheric pressure therein, together with a sieve bend mounted adjacent the bottom discharge end of the reservoir for separating the liquid into an overflow and an underflow fraction. Means are provided for automatically closing the discharge outlet of this first reservoir in response to the subatmospheric pressure therein as well as a feed tank in communication with the underflow discharge of the screening deck, and a pump in communication with the feed tank for carrying away the underflow fraction.

The sieve bend consists of a screening deck having spaced apart bars having slots therebetween of 0.5 mm. in width, thereby separating particles in an underflow of a maximum size of 0.25 mm. Such a sieve bend is constructed according to the teaching of the Fontein Patent 2,916,142, which teaching is included herein by reference.

According to this invention, the reservoir has a bottom pipe discharging onto the screening tank in a tangential direction, the outlet opening of the discharge pipe being in a vertical plane or inclined less than the vertical with respect to the longitudinal axis of the pipe. A flexible cover is suspended across this opening, this flexible cover being drawn against the opening by the subatmospheric pressure within the reservoir, thereby being operative in response to this subatmospheric pressure.

Further objects of this invention contemplate: (1) the provision of a suction pipe in communication with the sump and reservoir, the suction pipe including a cylindrical plate mounted to the suction pipe within the sump in concentrically spaced apart relationship, the lower edge of the plate being in substantially the same plane as the lower edge of the suction pipe within the sump; (2) the provision of a float in operative connection with means for intermittently providing a subatmospheric pressure within the reservoir, this means being operative in response to the level of liquid that carries the float within the sump; and (3) the provision of a fully automatic means for supplying the liquid and entrained solids within a sump to the sieve bend, the undesirable coarse particles being removed by the sieve bend and the liquid thereby being fed to the pump with solid particles of an allowable size.

Still a further object of this invention is the provision of a second closed reservoir in the pumping apparatus of the character described, this reservoir being connected to the feed tank by a non-return valve, and takes the place of a conventional pump. There is also means providing a lower pressure in the second reservoir than in the feed tank, which is periodically alternated with an overpressure for moving the contents of the second reservoir into a delivery pipe having a non-return valve. This cyclic pressure is controlled by the means for intermittently bringing about a subatmospheric pressure in the first reservoir of the apparatus. Accordingly, the feed tank need not be emptied with the aid of a pneumatic plunger pump; and, due to the provision of the common control the capacities of the two reservoirs can be accurately adjusted, one to the other. As the second reservoir takes the place of a plunger pump heretofore used, there is provided a cheap and relatively maintenance-free pumping apparatus.

A further object of this invention contemplates the provision of a pumping installation which includes a second reservoir having opposed tapered top and bottom walls which receive a pressure medium and a discharge pipe, respectively, this second reservoir carrying a ball for selectively closing these conduits. The ball has specific gravity which is greater than that of the pressure medium and lower than that of the liquid to be pumped.

With this arrangement, no air can enter the delivery pipe and no liquid can enter the conduit for the pressure medium. Preferably, an ejector is connected to this reservoir for bringing about a subatmospheric pressure therein. The discharge pipe of this ejector is provided with a valve, which once closed, provides discharge by causing an overpressure to be built up in the second reservoir, the valve further being capable of intermittent operation by the means for bringing about a subatmospheric pressure in the first reservoir. These features are likewise included in a modified construction of the first reservoir, wherein the suction pipe would then be provided with a non-return valve. An advantage of this latter embodiment is that the material to be separated is forceably ejected over the sieve bend, as a result of which the rate at which the process takes place is increased.

In still another embodiment of this invention, the second reservoir is mounted at such a height with respect to the feed tank that it can be fed by gravity; the conduit for the pressure medium is so connected to the means for intermittently bringing about a subatmospheric pressure in the first-mentioned reservoir so that only an overpressure is periodically brought about in the second reservoir. Also in this embodiment it is sufficient to use one ejector, which, however, need not be provided with a valve. The second reservoir can be placed in the feed tank and the non-return valve can be fitted in the wall of the second reservoir.

Still a further object of this invention contemplates the provision of an integral, compact and relatively inexpensive pumping apparatus of the character described, which is easily transportable from one location to another.

These and still further objects, advantages, and novel features of the present invention will become apparent in the specification and claims, taken in connection with the accompanying drawings.

Figure 1:
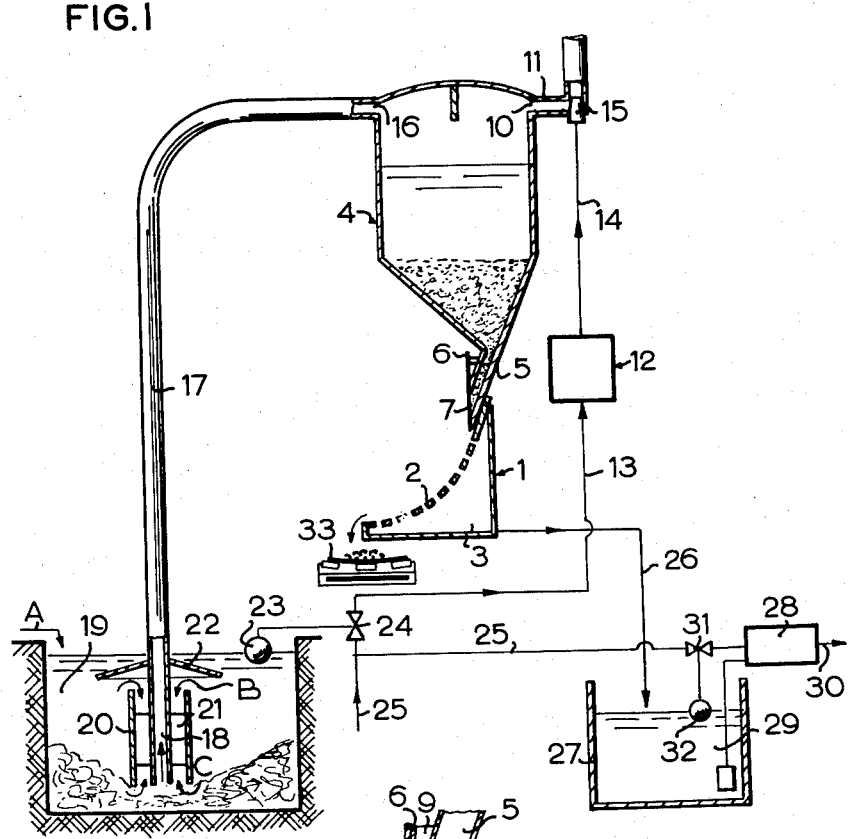
FIGURE 1 is an elevation diagrammatic view of a pump apparatus according to this invention.

Referring now to the accompanying drawings, there is shown in FIGURE 1 a pumping apparatus which includes a sieve bend 1 having a screening deck 2 consisting of spaced apart bars running parallel to the generatrices, this screening deck 2 being constructed according to the teaching of the Fontein Patent 2,916,142. The screening deck 2 may also include a perforated plate, the dimensions of the openings therethrough measured in the direction perpendicular to the generatrices being at the most equal to those measured in the direction parallel to the generatrices; and, if desired, the radius of the screening deck 2 may be infinite.

Figure 2:
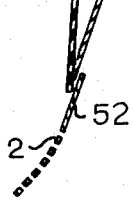
FIGURE 2 is an enlarged elevation section view of the lower part of the reservoir shown in FIGURE 1.

Mounted under the screening deck 2 of the sieve bend 1 is a collecting tank 3. Above the supply end of the sieve bend 1 is a closed reservoir 4 having a tubular lower end or pipe 5 which is positioned to discharge tangentially onto the upper or supply end of the sieve bend 1. As best shown in FIGURE 2, this pipe 5 has an outlet opening 8, the plane of this outlet opening 8 intersecting the pipe 5 at an acute converging angle, and at the maximum, in a vertical plane. A flexible cover 7 such as a rubber sheet is suspended from a plate 6 which is attached to brackets 9, in turn secured to the pipe 5 above the opening 8. Thus, the cover sheet 7 normally hangs across the opening 8 of the pipe 5.

Mounted immediately below the pipe 5 is a sloping plate 52 so positioned to form an extension of the supply end of the screening deck 2, the liquid and solids leaving the opening 8 of the pipe 5 thereby being spread into a layer which, in turn, passes across the screening deck 2.

The upper end of the reservoir 4 has an opening 10 to which is joined a suction pipe 11.

A compressed air pipe 13 is operatively connected with an ejector 15 via a conduit 14. A pneumatic regulating device 12 of well-known construction is disposed between the lines 13 and 15 to provide intermittent subatmospheric pressure in the tank 4. The reservoir 4 has another opening 16 which is connected to a suction pipe 17, the lower end 18 of this suction pipe 17 adapted to be in communication with a sump 19. The lower end 18 of the suction pipe 17 includes a cylindrical plate 20 mounted thereto in spaced apart relationship by means of suitable brackets 21. The lower edge of the suction pipe 17 and the cylindrical plate 20 are in substantially the same plane for reasons to become apparent. Mounted above the upper edge of the cylindrical plate 20 in spaced apart relationship is a protective plate 22, also secured to the suction pipe 17.

The surface of the liquid in the sump carries a float 23 which, in turn, controls a valve 24 in the compressed air supply line 25; and, as best shown in FIGURE 1, the valve 24 is joined to both the air suppply lines 25 and 13.

Connected to the underflow collecting portion 3 of the sieve bend 1 is a conduit 26 which is in communication at its other end with a feed tank or vessel 27. A plunger pump 28, driven by compressed air from the line 25 is mounted with its suction line in communication with the feed tank 27. The pump 28 also has a discharge pipe 30 for operatively removing the liquid from the tank 27, as is apparent, and an air supply valve 31, in the line 25, controlled by a float 32 carried on the surface by the liquid in the tank regulates the supply of air to the pump 28.

The operation of the pumping apparatus according to this embodiment of the invention is as follows: Mine water with contaminated solids of varying particle size, such as fragments of raw coal, flow continuously into the sump 19 where the solids settle. The cylindrical plate 20 prevents the opening of the lower end 18 of the suction pipe 17 from becoming clogged by solids, while the plate 22 serves to prevent the solids from settling in the space between the cylindrical plate 20 and the lower end 18 of the suction pipe 17.

When a pre-determined level in the sump 19 is exceeded, the float 23 opens the valve 24, and compressed air flows into the conduit 13 from the conduit 25. Compressed air thence flows through the control device 12 in such a manner that at predetermined intervals the conduit 13 is connected with the conduit 14, the compressed air flows through the ejector 15. Consequently, a subatmospheric pressure is provided in the reservoir 4 as air is exhausted through the line 11. Due to this subatmospheric pressure within the reservoir 4, the flexible cover 7 is drawn against the outlet opening 8 of the discharge pipe 5 (see FIGURE 2) and liquid is drawn into the reservoir 4 through the suction pipe 17.

At the same time, the liquid in the sump 19 is flowing through the annular space between the suction pipe 17 and the upper end of the plate 20 in the direction indicated by the arrows B, thereby entraining solid particles from the bottom of the well. As is apparent, the entrainment of solid particles may be enhanced by a proper selection of distance between the plate 20 and the suction pipe 17 in order to obtain a strong flow. The liquid may also flow in the direction indicated by the arrows C thereby entraining solid particles, the solid particles settling in the bottom of the reservoir 4 as shown in FIGURE 1.

After the flow of air through the ejector 15 has provided the partial vacuum in the reservoir 4, this vacuum will be overcome, and the liquid and solid particles will discharge through the pipe 5, pushing away the flexible cover 7. The material is then supplied to the screening deck 2 at the rate necessary for the proper operation of the sieve bend. In this regard, particles which are less than half the width of the slots flow through the slots together with the liquid to the collecting reservoir 3, through the conduit 26, and to the feed reservoir 27, where the underflow is pumped by the pump 28.

If a suitable width is chosen for the slots of the sieve bend, the particles which are allowed to pass therethrough will be so small that they are held in suspension in the liquid, thereby decreasing to a considerable extent the wear of the pump 28.

The overflow fraction retained on the sieve bend is discharged on the conveyor belt 33 for subsequent transportation, as necessary.

Figure 3:
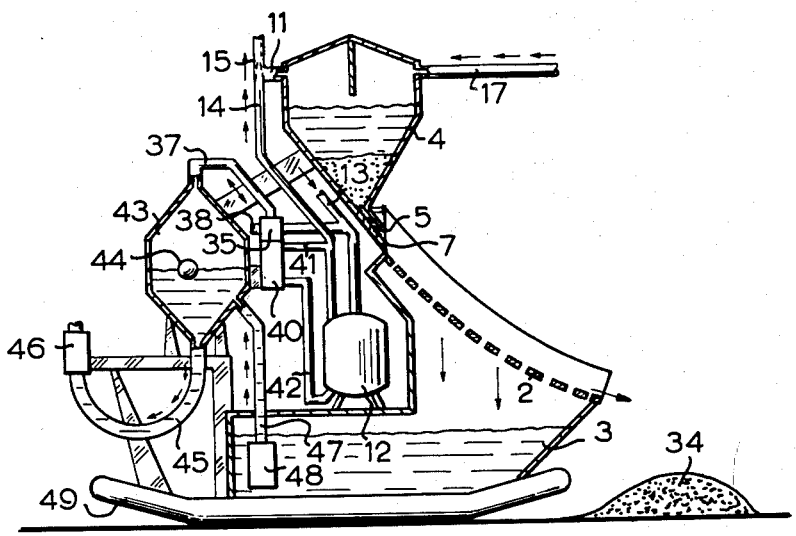
FIGURE 3 is a diagrammatic elevation view of a unitary, integrated pumping apparatus according to this invention.

Referring now to the embodiment of the invention shown in FIGURE 3, there is provided a sieve bend 2, together with an underflow collecting tank 3, which at the same time serves the function of the feeding tank 27 in FIGURE 1. The sieve bend is likewise fed by the reservoir 4 having a bottom discharge pipe 5 which can be shut off by a flexible cover 7.

The regulating device 12 is fed compressed air from the conduit 13, the device 12 intermittently admitting compressed air to the conduit 14 which is connected to the reservoir 4 through an ejector 14 and a conduit 11, identical to the arrangement shown in FIGURE 1.

A suction pipe 17 conveys the material to be processed, such as mine water containing coal and shale particles from a sump (not here shown) to the reservoir 4. The material collected in the reservoir 4 is discharged on the screening deck as is described in FIGURE 1, the overflow fraction being collected into a pile 34.

Figure 4:
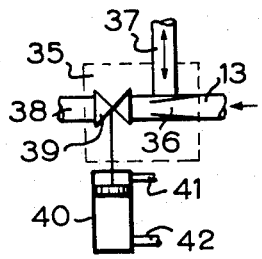
FIGURE 4 is a diagrammatic view of a control apparatus in FIGURE 3.

As best shown in FIGURE 4, a regulating unit 35 is provided which includes an ejector 36, a discharge pipe 37, and a vent line 38 which carries a valve 39. The ejector 36 is connected to the compressed air line 13 and the valve 39 is controlled by a piston and cylinder 40 which is operatively connected to the regulating device 12 by the conduits 41 and 42. The discharge pipe 37 is connected to the apex at the tapered top wall of a second closed reservoir 43. Contained within the reservoir 43 is a ball 44 made, for example, of polyethylene. The second reservoir also has a tapered bottom wall and connected to the apex thereof is a delivery or discharge pipe 45 which carries a one-way or check valve 46. The second reservoir 43 is connected to the feed tank 3 by a suction pipe 47 carrying another one-way or check valve 48. The complete apparatus is mounted on a sled 49, as is customary with the portable installations generally used in the mining industry.

The operation of the embodiment of this invention shown in FIGURES 3 and 4 is as follows: Upon arrival of the apparatus to the point where water mixed with solids is to be removed from a sump, the suction pipe 17 is connected to the sump, a discharge line is connected to the delivery pipe 45 downstream of the check valve 46, and the compressed air for the operation of the apparatus is introduced through the conduit 13.

The regulating device 12 intermittently provides on overpressure in the conduit 14 thereby providing an intermittent subatmospheric pressure in the conduit 11 and the first reservoir 4. Consequently, the flexible cover 7 will close the discharge outlet 5 of the reservoir 4 and water and solids are drawn from the sump into the first reservoir 4 by the suction pipe 17, the particles collecting on the bottom of the first reservoir 4.

When the first reservoir 4 does not have a subatmospheric pressure, the flexible cover 7 is open and the contents of this reservoir 4 are discharged through the pipe 5 onto the sieve bend 2. The overflow fraction is collected in a pile 34 and the liquid together with the underflow fraction passes through the screening deck 2 and is collected in the tank 3. The liquid is intermittently drawn from this tank 3 through the check valve 48, suction pipe 47, and into the second reservoir 43. Subsequently, the liquid is intermittently forced out of the reservoir 43 into the conduit 45, the ball 44 floating on the water shuts off the conduit 37 if the reservoir 43 should become completely filled, thereby preventing liquid from entering the pneumatic system. When the ball 44 closes the conduit 37, of course, there is only delivery of the liquid to the reservoir 43 via the pipe 45.

Should the reservoir 43 become completely empty, the ball 44 will close the conduit 45, thereby preventing compressed air from passing through the conduit 45. In this situation, of course, there is only provided a suction of a liquid from the tank 3 into the second reservoir 43.

As will now become apparent, the alternating pressure in the conduit 37 (and the second reservoir 43) is brought about by automatically closing and opening the valve 39. When the valve 39 is open, the ejector 36 draws air from the conduit 37 expelling the air via the valve 39 and the vent line 38. When the valve 39 is closed, air pressure is directed through the conduit 37 into the reservoir 43, the ejector, of course, not here operating as such. The valve 39 is automatically opened and closed by virtue of the connecting lines 41 and 42 of the piston and cylinder 40 being connected to the regulating device 12 so that an overpressure is automatically brought about in either of these two lines.

Figure 5:
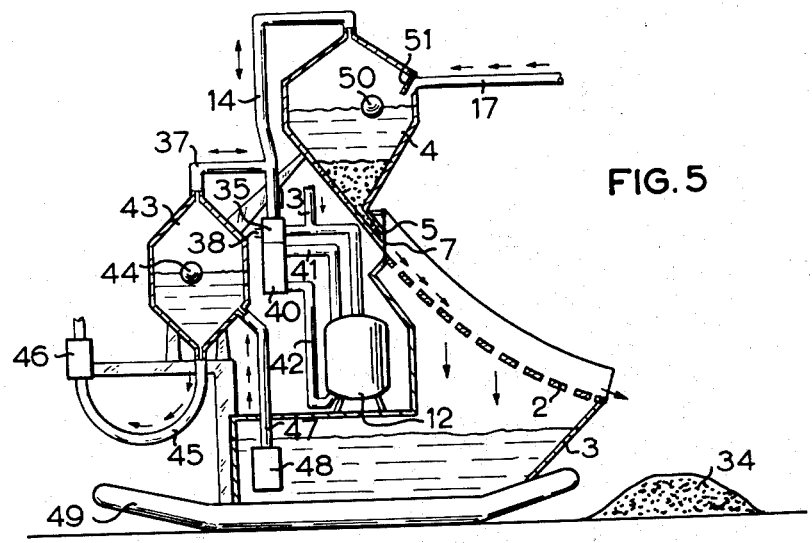
FIGURES 5 and 6 are diagrammatic elevation section views of still further embodiments of the present invention.

Turning now to FIGURE 5, a further modification of the invention is provided. This apparatus differs from the FIGURE 3 apparatus in that the conduit 14 is a portion of conduit 37 wherein a subatmospheric pressure and an overpressure are alternately provided, the ejector 15 being omitted. The conduit 14 is connected to the apex in the tapered top wall of the reservoir 4, the bottom wall of the reservoir 4 also being tapered. The first reservoir 4 also carries a ball 50 and has a function identical to the ball 44 in the reservoir 43. The suction pipe 17 in the embodiment of the invention shown in FIGURE 5 is provided with a check valve 51 as is necessary.

By virtue of the subatmospheric and overpressure being automatically provided in the reservoir 4, the material is alternately drawn through the suction pipe 17, as the cover plate 7 closes the discharge outlet 8, and thence the outlet 8 subsequently opens when the valve 51 is closed due to the overpressure in the tank 4.

Figure 6:
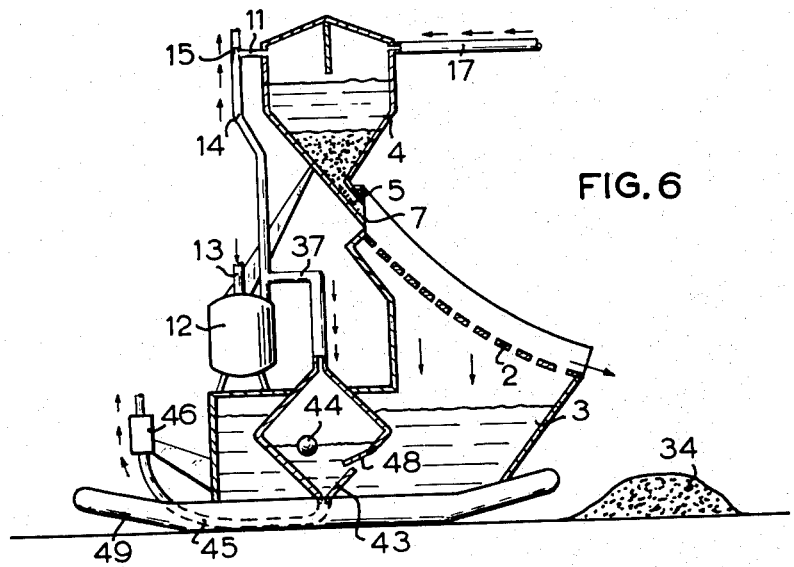

In FIGURE 6 a still further embodiment of the invention shown in FIGURE 3 is shown. Here, the ejector 36 and related elements shown in FIGURE 4 have been omitted. In this regard, the second reservoir 43 is placed within the tank 3 and the conduit 37 is connected to the conduit 14, thereby eliminating the conduit 47. As is apparent, an overpressure is intermittently provided in the reservoir 43. If no overpressure prevails in the reservoir 43, the liquid in the tank 3 opens a one-way valve 48 mounted on the wall of the reservoir 43. When an overpressure is brought about in reservoir 43 via line 37 and the regulating device 12, the valve 48 is closed and the liquid flow is forced into the discharged line 45.

Likewise, the apparatus described in FIGURES 5 and 6 may be combined, in which arrangement the first reservoir 4, constructed as shown in FIGURE 5, and the second reservoir, constructed as shown in FIGURE 6, are combined. In this apparatus, the conduit 37, for example, may be a branch of the conduit 42.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative and not in a limiting sense.

What is claimed is:

1. Pumping apparatus for automatically draining off a liquid containing solid particles which is collected in a sump or the like, comprising: a sieve bend adapted to be mounted above the sump including a screening deck having an upper supply end and a lower discharge end, said screening deck including spaced apart perforations providing a separation of the liquid containing solid particles into an overflow fraction and an underflow fraction; feed tank means for collecting the underflow fraction from said screening deck; pump means operatively connected to said feed tank means; a first closed reservoir mounted above the supply end of said screening deck; means in communication with the upper region of said reservoir for intermittently providing a subatmospheric pressure therein; said reservoir including a suction line adapted for communication with the sump, and further including a discharge means at its lower end positioned to discharge onto the supply end of said screening deck, said discharge means including a pipe inclined downwardly with respect to the horizontal for discharging tangentially onto said screening deck, said pipe having a generally flat discharge outlet situated in a plane disposed at maximum in a vertical plane while being in an acute converging angle with respect to the longitudinal axis of said pipe; and means for closing said discharge outlet responsive to subatmospheric pressure within said reservoir, said outlet closing means including a flexible cover suspended adjacent said discharge outlet whereby said cover is drawn against said discharge outlet by subatmospheric pressure within said reservoir.

2. Pumping apparatus defined in claim 1 wherein the end of said suction line adapted for communication with the sump includes a generally cylindrical plate mounted thereto in spaced apart relationship, the lower edge of said plate being in substantially the same plane as the lower edge of said suction line.

3. Pumping apparatus defined in claim 1 including a second closed reservoir having a one-way discharge line connected thereto; a one-way feed line from said feed tank means to said second reservoir; and means providing an alternating higher and lower pressure in said second reservoir relative to said feed tank means for alternatively forcing the contents therefrom through said second reservoir discharge line and for drawing contents thereto via said feed line from said feed tank means, said alternating pressure means being controlled by said means for intermittently providing a subatmospheric pressure in said first reservoir.

4. Pumping apparatus defined in claim 3 wherein the top and bottom walls of said second reservoir are tapered, said alternating pressure means including a pressure feed line communicating with the apex of said tapered top wall, said one-way discharge line communicating with the apex of said tapered bottom wall, and a ball within said second reservoir for selectively closing said lines, said ball having a specific gravity which is greater than that of the pressure medium and lower than that of the liquid to be pumped.

5. Pumping apparatus defined in claim 3 wherein said alternating pressure means for said second reservoir includes an ejector operatively connected thereto, said ejector providing the sole means for bringing about a subatmospheric pressure therein; a discharge pipe connected to said ejector including valve means which, when closed, prevents ejection by causing an over-pressure to be built up in said second reservoir, said valve means being intermittently opened and closed by said means for bringing about a subatmospheric pressure in said first reservoir.

6. Pumping apparatus defined in claim 5 wherein the top of said first reservoir includes a tapered top wall, said discharge pipe being connected between said ejector and the apex of said first reservoir top wall, the bottom wall of said first reservoir also being tapered, and said first reservoir discharging means being in communication with the apex of said first reservoir bottom wall; a ball within said first reservoir for selectively closing the apex outlets thereof, said ball having a specific gravity greater than that of the pressure medium and lower than that of the liquid to be pumped; and said suction line in communication with said first reservoir including a one-way valve.

7. Pumping apparatus defined in claim 4 wherein said second reservoir is positioned with respect to said feed tank means to receive liquid through said one-way feed line by gravity, said second reservoir alternating pressure means being operatively connected to said first reservoir subatmospheric pressure means to provide only an over-pressure in said second closed reservoir.

References Cited in the file of this patent

UNITED STATES PATENTS

| | | |
|---|---|---|
| 33,736 | Elliot | Nov. 19, 1861 |
| 1,506,652 | Maker | Aug. 26, 1924 |
| 1,518,890 | Aikman | Dec. 9, 1924 |
| 2,433,408 | Tollefsen | Dec. 30, 1947 |
| 2,525,581 | Bierman | Oct. 10, 1950 |
| 2,621,596 | Jacuzzi | Oct. 10, 1950 |
| 2,666,671 | Kimmerle | Jan. 19, 1954 |

FOREIGN PATENTS

| | | |
|---|---|---|
| 110,047 | Australia | Mar. 7, 1940 |
| 546,111 | Canada | Sept. 10, 1957 |